(No Model.)
T. E. SCANTLIN.
Evaporating Pan.
No. 237,448. Patented Feb. 8, 1881.
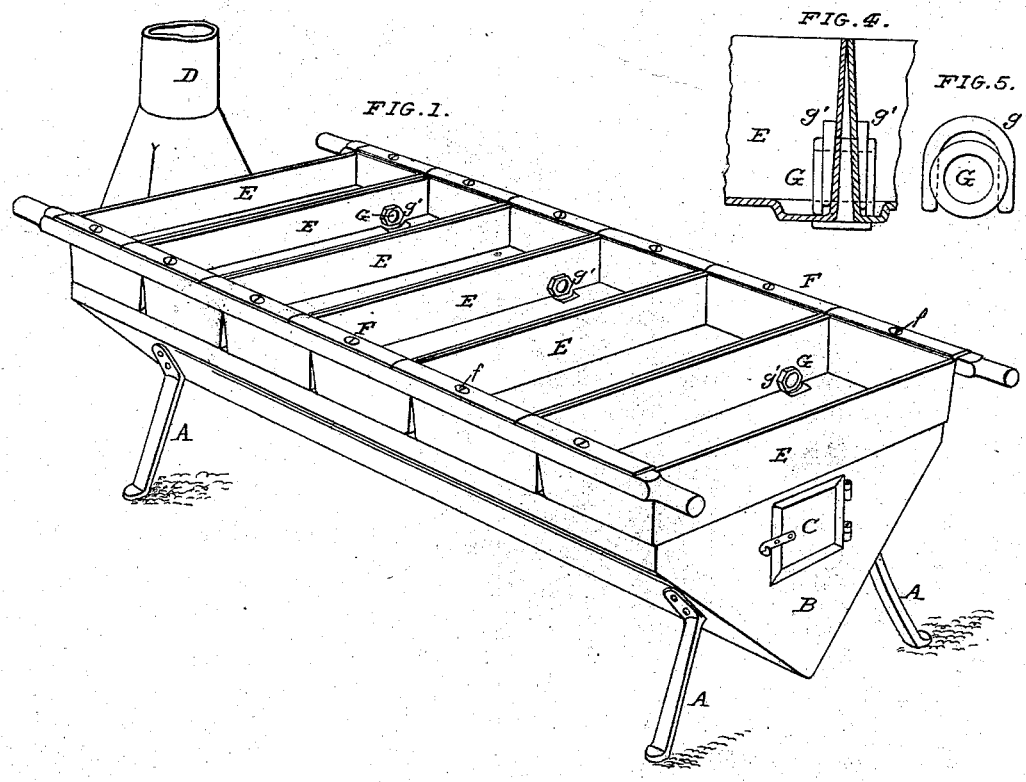
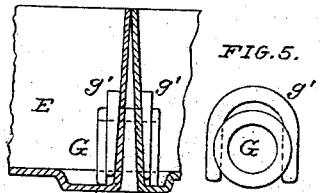
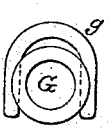
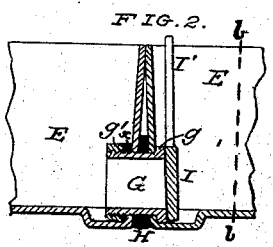
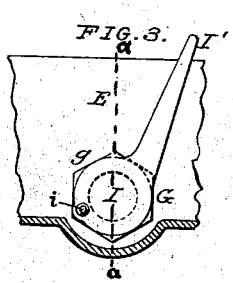
ATTEST:
Geo. H. Knight
Walter Allen
INVENTOR.
Thomas E. Scantlin
By Knight Bros.
Attys.

UNITED STATES PATENT OFFICE.

THOMAS E. SCANTLIN, OF LA FAYETTE, INDIANA.

EVAPORATING-PAN.

SPECIFICATION forming part of Letters Patent No. 237,448, dated February 8, 1881.

Application filed May 3, 1880. (No model.)

*To all whom it may concern:*

Be it known that I, THOMAS E. SCANTLIN, residing at La Fayette, Tippecanoe county, Indiana, have invented Improvements in Evaporating-Pans, of which the following is a specification.

My improvement consists in the construction of the connection for flaring pans by inserting between them a distance-block with an aperture for the passage of the connecting-tubes.

My improvement also consists of a forked key for fastening and tightening up the tubular connections.

In the drawings, Figure 1 is a perspective view of the pan, composed of a number of detachable flaring sections. Fig. 2 is a detail section at $a\ a$, Fig. 3. Fig. 3 is a detail section at $b\ b$, Fig. 2. Fig. 4 is a similar section to Fig. 2, except that the coupling is shown in a modified form. Fig. 5 is a front view of one end of the coupling illustrated in Fig. 4.

A A are the legs. B is the furnace, with fire-door C and chimney D. E E are the pans, attached to side rails, F, which extend at the ends in the form of handles. The pans are connected to the rails F by screws $f$, or by bolts, or by any means allowing their disconnection, whenever required, for shipping, repairs, or other purpose.

Communication is made from the interior of one pan to that of another by means of the tubular couplings. These couplings have a tube, G, passing through apertures in the sides of the two pans, and with a shoulder, $g$, at one end, bearing against the inside of a pan, the other end of the tube being screw-threaded to receive a nut, $g'$, as shown in Figs. 1, 2, and 3, or notched to receive a forked wedge or key, as shown in Figs. 4 and 5. In the latter case a washer may be interposed between the key and the side of the pan. Gaskets may be used to prevent leakage.

When the pans are made of flaring shape, as shown, it will be seen that their sides will be in contact only at their upper edge.

To prevent the sides springing outward under the pressure of the shoulder $g$ and nut or wedge or other fastening $g'$, I insert between the pans, at the place where the coupling-tube G passes through, a filling or distance block, H, which extends from pan to pan, and is traversed by the coupling-tube.

At I is shown a gate or slip-valve, turning on a pivot, $i$, and fitting the end of the tube G, to close it when in the position shown in Fig. 3. The gate has a handle, I', by which it is operated.

I am aware that it is not new to construct sectional evaporating-pans with removable tubular connections; and I also disclaim invention of the valve for closing such tubes, my improvements consisting of the specific devices set forth in the subjoined claims.

I claim as my invention—

1. The combination, with the tube G and pans E E, of the filling-piece H, substantially as and for the purpose set forth.

2. The combination of the pans E E and tube G, having shoulders or flanges on its ends, with the forked wedges $g'\ g'$, as set forth.

3. The combination of the pans E E and tube G, having end flanges, as shown, with the forked wedges $g'\ g'$ and wedge-shaped filling H.

THOMAS E. SCANTLIN.

Witnesses:
SAML. KNIGHT,
GEO. H. KNIGHT.